Nov. 29, 1960 H. A. SCHNEIDER 2,962,212

HIGH SPEED BINARY COUNTER

Filed June 22, 1956 5 Sheets-Sheet 1

INVENTOR
H. A. SCHNEIDER
BY Alan C. Rose
ATTORNEY

Nov. 29, 1960 H. A. SCHNEIDER 2,962,212

HIGH SPEED BINARY COUNTER

Filed June 22, 1956 5 Sheets-Sheet 2

INVENTOR
H. A. SCHNEIDER
BY
Alan C. Rose
ATTORNEY

Nov. 29, 1960 H. A. SCHNEIDER 2,962,212

HIGH SPEED BINARY COUNTER

Filed June 22, 1956 5 Sheets-Sheet 3

INVENTOR
H. A. SCHNEIDER

BY Alan C. Rose

ATTORNEY

Nov. 29, 1960 H. A. SCHNEIDER 2,962,212

HIGH SPEED BINARY COUNTER

Filed June 22, 1956 5 Sheets-Sheet 4

INVENTOR
H. A. SCHNEIDER
BY Alan C. Rose
ATTORNEY

INVENTOR
H. A. SCHNEIDER
BY Alan C. Rose
ATTORNEY

United States Patent Office 2,962,212

Patented Nov. 29, 1960

2,962,212

HIGH SPEED BINARY COUNTER

Herbert A. Schneider, Englewood, N.J., assignor to Bell Telephone Laboratories, Incorporated, New York, N.Y., a corporation of New York Filed June 22, 1956, Ser. No. 593,292

7 Claims. (Cl. 235—92)

This invention relates to computer circuits, and more particularly to binary counters.

Binary counters characteristically include a series of memory cells each of which can assume either of two output states and which are energized in response to the application of input pulses. Assuming that one state of each memory cell represents the binary digit "0" and the other state represents the binary digit "1," the states of the memory cells of a five-stage counter as ten pulses are received are as follows.

*Table I*

| Number of Pulses Applied to Counter | Binary Number Represented by Memory Cells |
|---|---|
| 0 | 00000 |
| 1 | 00001 |
| 2 | 00010 |
| 3 | 00011 |
| 4 | 00100 |
| 5 | 00101 |
| 6 | 00110 |
| 7 | 00111 |
| 8 | 01000 |
| 9 | 01001 |
| 10 | 01010 |

In the foregoing table, the state of the memory cell representing the least significant digit appears as the right-hand digit in the column of the binary numbers, and the states of the other five memory cells are shown by the other four digits in order of increasing significance from right to left. It may be noted in the table that the application of the eighth pulse changes the binary number indicated by the counter from 00111 (representing the Arabic number 7) to 01000 (representing the Arabic number 8). This means that the three memory cells representing the least significant digits must change from the "1" to the "0" state, and that the fourth cell must change from the "0" to the "1" state.

In many counters of the prior art, the required changes of state are accomplished by the application of input pulses to the counter stage representing the least significant digit. Whenever the memory cell of a stage is changed from the "1" to the "0" state, a "carry" pulse is transmitted to the next stage of the counter. Thus, for example, when the eighth pulse is received and the counter changes from the 00111 state to the 01000 state, carry pulses are successively transmitted from the first to the second, to the third, and finally to the fourth stage of the counter. The time required for the successive carries is termed the "carry propagation interval," and this may significantly reduce the operating speed of the counter.

Accordingly, one object of the present invention is to reduce the delay required for the carry propagation function in binary counters.

During the carry propagation interval in binary counters as described above, the states of the counter stages change progressively. Thus, for example, after the reception of the eighth pulse, the counter changes from 00111 (representing 7) to 01000 (representing 8) but has, as one of several intermediate states, the erroneous number 00100 (representing 4). False output readings of this type are present for the duration of the carry propagation interval, and this can be a moderately long period when the counter includes many stages.

Another object of the invention is the elimination of false output indications in binary counting circuits.

In accordance with the present invention, an array of coincidence circuits or "AND" units interconnect the source of input pulses and the memory cells of the counter. In addition, padding delay units are employed in combination with the array of AND units to insure changing the state of all of the memory cells simultaneously. The resultant circuit not only substantially reduces the delay often associated with carry propagation, but also avoids the false readings which are often present in counters of the prior art during carry propagation intervals.

The nature of the array of AND units employed in the present counter is important and will therefore be set forth in some detail. Specifically, control circuits are provided for simultaneously de-energizing one memory cell and energizing the memory cell associated with the next more significant binary digit. The source of input pulses is connected to the enabling input of the first memory cell of the counter and to a first AND circuit in the array of AND units. The output from this first AND unit is connected to the control circuit of the second stage of the counter and to at least two additional AND circuits. The outputs from the two additional AND units are applied to the control circuits of stages of the counter representing digits of greater significance. In each case, the remaining inputs to the AND units are energized, either directly or after consolidation by other AND units, by output circuits from the memory cells of counter stages representing less significant digits.

An important advantage of the present invention is the relatively short delays required for the carry propagation function as compared with the number of counter stages which are employed. For example, in counters in which carries are propagated from stage to stage, the over-all delay is proportional to the number of counter stages. In accordance with the present circuits, however, the time required for the carry function is approximately proportional to the logarithm to the base two of the number of counter stages. Thus, for example, for a sixteen-stage counter, the time would be that required for the transmission of pulses through five AND circuits and one memory cell in succession. In the specific technology with which the circuits disclosed in this application will be related, this amounts to a delay of only six-tenths of a microsecond (0.0000006 second), as compared with about three times this delay which would be required with carry propagation circuits of the prior art.

Other objects and advantages, and various features of the invention may be readily apprehended by reference to the following description of illustrative embodiments of the invention, from the claims, and from the drawings.

Figure 1:
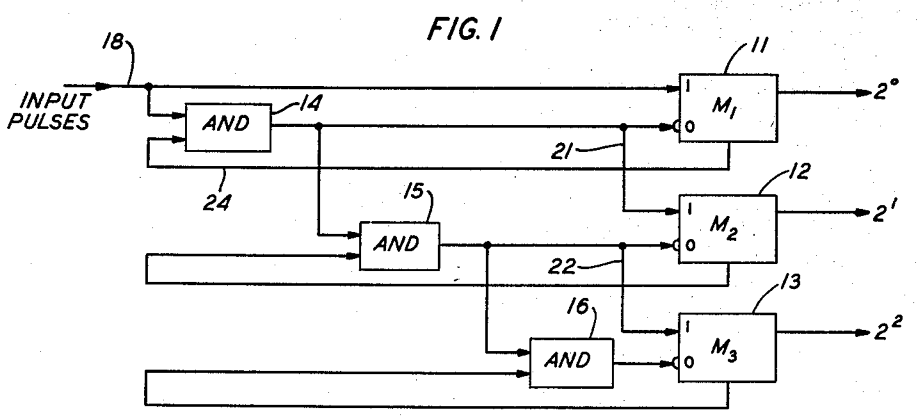
Fig. 1 is a logic circuit diagram of a simplified three-stage counter circuit.

With reference to the drawings, Fig. 1 shows a simple three-stage binary counter. The logic units included in Fig. 1 are the three memory cells 11, 12, and 13, and the three AND units 14, 15, and 16. With only three memory cells, the binary counter circuit of Fig. 1 can only count up to seven. The states of each of the three memory cells as successive pulses are received on the input lead 18 are indicated in the following table, with the state of the memory cells 11, 12, and 13 appearing in order from right to left.

*Table II*

| Number of Pulses Applied to Counter | Binary Number Represented by Memory Cells |
|---|---|
| 0 | 000 |
| 1 | 001 |
| 2 | 010 |
| 3 | 011 |
| 4 | 100 |
| 5 | 101 |
| 6 | 110 |
| 7 | 111 |
| 8 | 000 |

The rule for changing the state of counter stages upon the arrival of a pulse is as follows: starting with the counter stage representing the least significant digit, change each counter stage which is in the "1" state to the "0" state until the first counter stage in the "0" state is reached. Then change this last counter stage to the "1" state. In the simple counter circuit of Fig. 1, this rule is implemented by the AND circuits 14, 15, and 16.

In the circuit of Fig. 1, each memory cell has a reset lead designated "0" and marked with a small semicircle at the junction of the lead and the box representing the memory cell, and an energization input lead designated "1." In operation, pulses applied to the reset lead of each memory unit take precedence over signals applied to the energization input lead of memory cells. To conveniently implement the rules noted above, each of the control leads such as 21 and 22 are connected to the reset input terminal of the memory cells representing a binary digit and to the energization input terminal of the memory cell representing the next more significant digit.

Assuming that all three memory cells 11, 12, and 13 are in the "0" state, the application of the first pulse on lead 18 energizes memory cell 11. The other input to the AND unit 14 is not energized, however, and the first pulse is therefore blocked from control lead 21. As soon as memory unit 11 is energized, the lead 24 connecting memory cell 11 to the other input of AND unit 14 is energized, and the AND unit is prepared to pass the next successive pulse.

When the second pulse arrives, it is gated through AND unit 14, and is applied to control lead 21. It energizes memory cell 12. It also has the effect of overriding the application of the input pulse applied to the energization lead of memory cell 11, and resets it to the "0" state. Similarly, the distribution of subsequent input pulses is controlled by the AND gates 14, 15, and 16 and the previous states of the memory cells to energize them in accordance with the pattern shown in the foregoing Table II.

Figure 2:
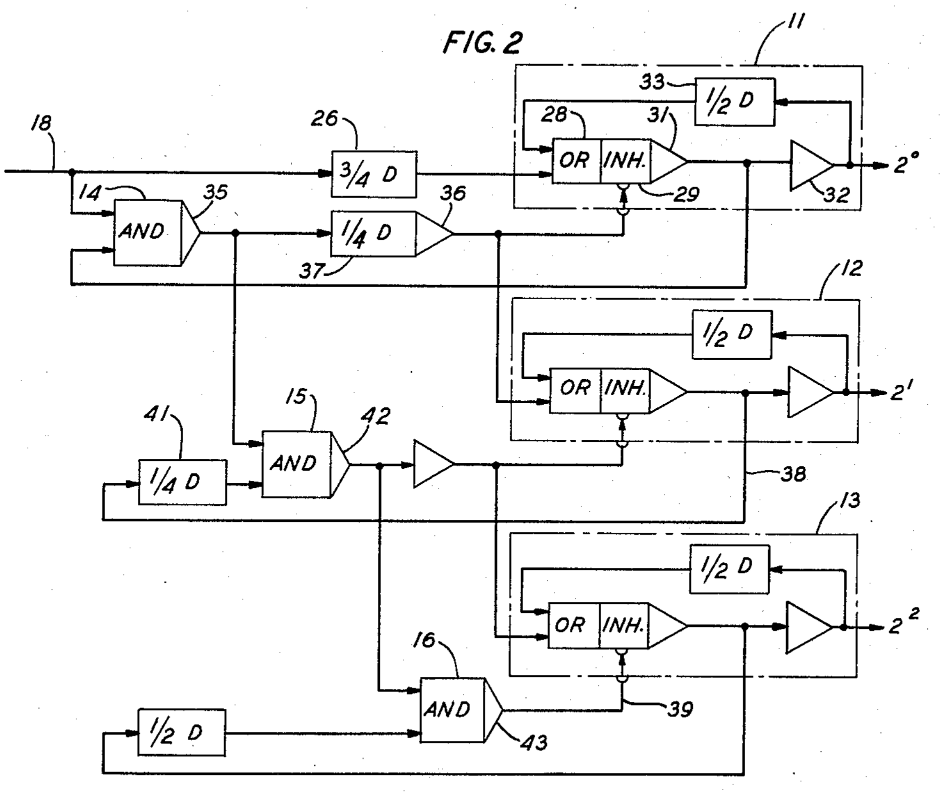
Fig. 2 is a more detailed version of a three-stage counter circuit, including padding delay units in accordance with the invention.

Fig. 2 is a detailed logic circuit diagram, and shows the pulse regenerators, delay units, and the details of the memory cells required for the implementation of the circuit of Fig. 1 in accordance with one specific serial binary computer technology. Before proceeding with a detailed description of Fig. 2, the instrumentation of the individual components shown in this figure will be discussed briefly.

An AND unit, such as that shown at 14, 15, or 16 in Fig. 2 produces an output pulse when all of its inputs are enabled. AND units are also called coincidence gates.

A delay unit (D) such as the unit 26 in Fig. 2 delays applied signals by a time interval indicated within the unit. In a serial binary computing apparatus, binary digits are transmitted by the presence or absence of pulses in successive time intervals which are termed "digit periods." The legend "¾ D" which appears in the delay unit 26 in Fig. 2 indicates a delay of three-quarters of a digit period.

An OR unit, such as that shown at 28 in Fig. 2, produces an output pulse when any or all of its input leads are energized. OR units are buffer circuits which permit the combining of signals from several input circuits while preventing the flow of current between the input circuits.

Inhibit units (INH), such as unit 29 in Fig. 2, generally have an inhibiting input lead and one or more normal input leads. The inhibiting input lead is marked by a semicircle, and the output of the inhibit unit is blocked when that lead is energized. The normal inputs to an inhibit unit produce an output signal only if they are all energized and if no pulse is applied to the inhibiting input lead of the unit.

Pulse regenerators, such as that shown at 31 in Fig. 2, are employed to maintain proper voltage levels and to insure synchronism of operations throughout the computer. Pulse regenerators normally introduce a small amount of delay; in the circuits shown in the drawings, each regenerator introduces one-quarter digit period of delay.

Many realizations of these circuits have been proposed heretofore, and the present circuits are not limited to any specific form of these circuit units. As a specific example, one workable set of logic packages is disclosed in an article entitled "Regenerative Amplifier for Digital Computer Applications" by J. H. Felker, which appeared on pages 1584 through 1596 of the November 1952 issue of the Proceedings of the Institute of Radio Engineers (volume 40, No. 11). Another set of circuits which may be employed is disclosed in my copending application Serial No. 456,648, filed September 17, 1954, now Patent No. 2,888,557, issued May 26, 1959, and in J. H. Vogelsong application Serial No. 437,401, filed June 17, 1954, assigned to the assignee of the present application.

As mentioned above, Fig. 2 differs in one respect from Fig. 1 in showing the details of one type of circuit suitable for the memory units 11, 12, and 13. For specific example, the memory cell 11 includes the OR unit 28, the inhibit unit 29, the pulse regenerators 31 and 32, and the one-half digit delay unit 33. When pulses are applied to the OR unit 28, they normally propagate around the delay loop including the circuit elements enumerated above. With each of the pulse regenerators 31 and 32 introducing one-quarter digit period of delay and the delay unit 33 introducing an additional one-half digit period of delay, the total delay in the loop is one digit period. When pulses are applied to the inhibiting input terminal of the inhibit unit 29, however, further circulation of a pulse in the delay loop of the memory cell is blocked. Similarly, when pulses are applied both to the OR unit 28 and to the inhibiting input terminal of the inhibit unit 29, no output appears in the delay loop of memory cell 11. As long as memory cell 11 is in the energized, or "1" state, pulses appear at the output terminal designated "$2^0$" once each digit period. After the memory cell 11 has been reset to the "0" state by application of a pulse to the inhibiting input terminal of the unit 29, no further pulses appear at the output of the memory cell. The structure and mode of operation of the memory cells 12 and 13 are identical with that of memory cell 11, as described above.

The circuit of Fig. 2 also differs from the prior art circuit of Fig. 1 in the use of padding delay units to control the instant of energization of the memory cells. As mentioned in the introduction of this specification, during the carry propagation interval in many of the counter circuits of the prior art, false output signals are produced. In accordance with one aspect of the present invention, however, padding delay units are provided to equalize the delay between the input lead 18 and each of the memory cells 11, 12, and 13.

In Fig. 2, the delay between the input lead 18 and each of the memory cells is three-quarters of a digit period. For example, the direct input from lead 18 to the memory cell 11 includes the three-quarter digit period delay unit 26. The connection between the input lead 18 and the inhibiting terminal of the memory cell 11 includes delay introduced by the pulse regenerators 35 and 36, in addition to the delay provided by the one-quarter digit period delay unit 37. Similarly, the delay from each memory unit back to the input leads of any of the memory units also includes three-quarters of a digit period of delay. For example, the connection from the carry output lead 38 of the memory cell 12 to the inhibiting input 39 of the memory cell 13 includes the one-quarter digit delay unit 41, the pulse regenerator 42 associated with the AND unit 15, and the pulse regenerator 43 associated with the AND unit 16. The one-quarter digit period of delay introduced by each of the pulse regenerators combined with the one-quarter digit of delay provided by the delay unit 41 is equal to the three-quarters of a digit period of delay mentioned above. It may also readily be shown that the net delay between the input lead 18 and either input of the memory cells 11, 12, and 13 is equal to three-quarters of a digit period of delay. Likewise, the net delay included in each circuit connecting the carry output of any of the memory cells to the input of one of the memory cells is also equal to three-quarters of a digit period of delay.

From the foregoing analysis, it is clear that input pulses applied to the input lead 18 which are not blocked at one of the AND units will reach the memory cells 11, 12, and 13 simultaneously. Accordingly, the memory units which change their state do so simultaneously, and no false output readings are ever present at the output terminals of the memory cells 11, 12, and 13.

Figure 3:
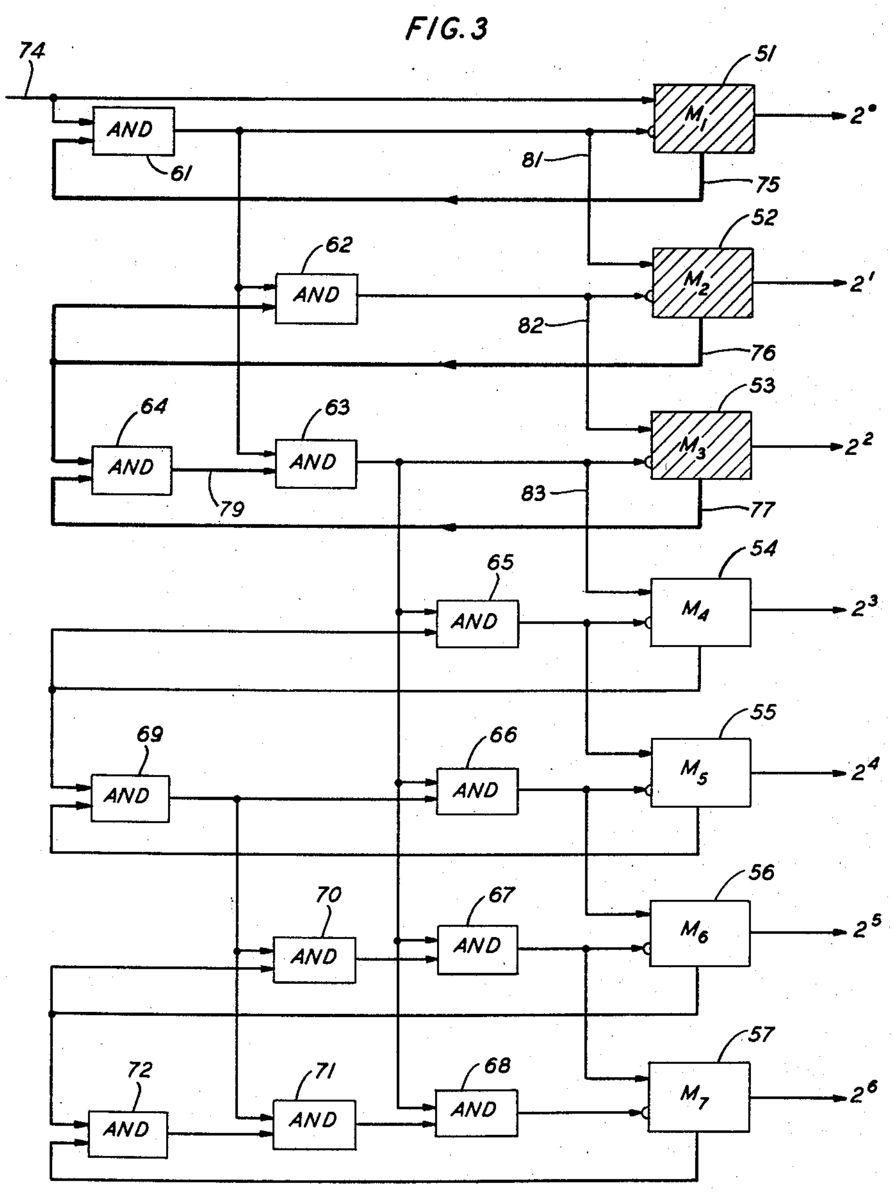
Fig. 3 is a logic circuit diagram of a multistage counter circuit including a binary array of AND units in accordance with the invention.

Fig. 3 is a circuit diagram of a seven-stage binary counter. The counter of Fig. 3 includes the output memory cells 51 through 57, and an array of AND units which are numbered 61 through 72. The array of AND units is arranged so that pulses from the input lead 74 are applied in accordance with the logical rule set forth above. That is, starting with the memory cell representing the least significant digit, each memory cell in the energized state is reset to the "0" state until the first memory cell is reached which is in the de-energized or "0" state; this first memory cell in the "0" state is energized. The states of the more significant memory cells remain unchanged.

To indicate the operation of the circuit of Fig. 3 in a particular instance, let us consider the situation where the memory cells 51, 52, and 53 are energized at the time of arrival of an additional pulse on the input lead 74. The energization of the memory cells 51, 52, and 53 is indicated in Fig. 3 by shading lines through the boxes representing these memory cells. The energization of memory cells 51, 52, and 53 produces output pulses on the carry output leads 75, 76, and 77, respectively, associated with the memory cells 51, 52, and 53. These energized carry output leads and their connections to inputs of the AND units 61, 62, and 64 are indicated by connections represented by heavy lines. In addition, the output lead 79 from the energized AND unit 64 to the AND unit 63 is shown by a heavy line, indicating that one input lead of the AND unit 63 is enabled.

When an additional pulse on lead 74 is received, it is gated through the AND units 61, 62, and 63 by the pulses present on the energized leads. A control lead 81 is connected to the reset terminal of memory unit 51 and to the energization input terminal of the memory cell 52 representing the next more significant digit. Similarly, control lead 82 is connected to the reset and energization terminals of memory cells 52 and 53, respectively, and control lead 83 is connected to the reset and energization input leads of memory cells 53 and 54, respectively. When pulses are applied to these control leads 81, 82, and 83 by the AND units 61, 62, and 63, the signals on the reset terminals override the signals applied on the energization terminals, and all three of the memory cells 51 through 53 are de-energized.

The control lead 83 applies an energization signal to the memory unit 54. In the absence of pulses applied to the reset terminal of memory unit 54, this memory cell becomes energized. This operation completes the description of the reaction of the counter circuit of Fig. 3 to the reception of the eighth pulse applied to the seven-stage counter, and the resultant transition of its output indication from 0000111 to 0001000.

As discussed in connection with Fig. 2, each AND unit has a pulse regenerator associated with it which introduces some delay. The time required for completion of a counting operation is determined by the number of AND circuits which must be traversed. In the circuit of Fig. 3, the AND unit 64 is located to receive carry signals from the memory units 52 and 53 and combine them for application to one input of AND unit 63. By placing the AND unit 64 as indicated in Fig. 3, the pulses from memory units 52 and 53 are being combined at the same instant that the input pulse on lead 74 is being gated through the AND unit 61 by a carry pulse from the carry output lead 75 from memory cell 51. This eliminates the time which would otherwise be required for combining the input pulse with the carry output pulse from the memory cell 53. Similarly, the AND units 69, 70, 71, and 72 are employed to combine carry signals rather than for the purpose of gating the signal pulses applied to lead 74 directly to the memory units. In view of the fact that the output signals from memory cells 54 through 57 are available prior to the arrival of the next subsequent pulse, the AND units 69 through 72 may have control signals available at the inputs of AND units 65 through 68 at the time of arrival of pulses from AND circuit 63. Accordingly, when conditions require the change of state of memory cell 57, for example, the input pusle from lead 74 only passes through the three AND gates 61, 63, and 68. This is in contrast to the six series connected AND gates through which the input pulse would be gated if the circuit of Fig. 3 were patterned directly after that of Fig. 1.

The use of an AND array such as that described in the preceding paragraphs saves a considerable amount of time as compared with systems in which the input pulse must be gated through as many successive gates as there are counter stages. Similarly, it is much more economical of time than counters in which carry pulses propagate from one memory cell to the next subsequent energized memory cell. For example, in accordance with either of the two prior art systems mentioned above, a seven-stage counter would require time for at least six separate gating functions. In the counter shown in Fig. 3, however, only the time for three gating operations is required for the application of input pulses to the appropriate memory cells.

Figure 4:
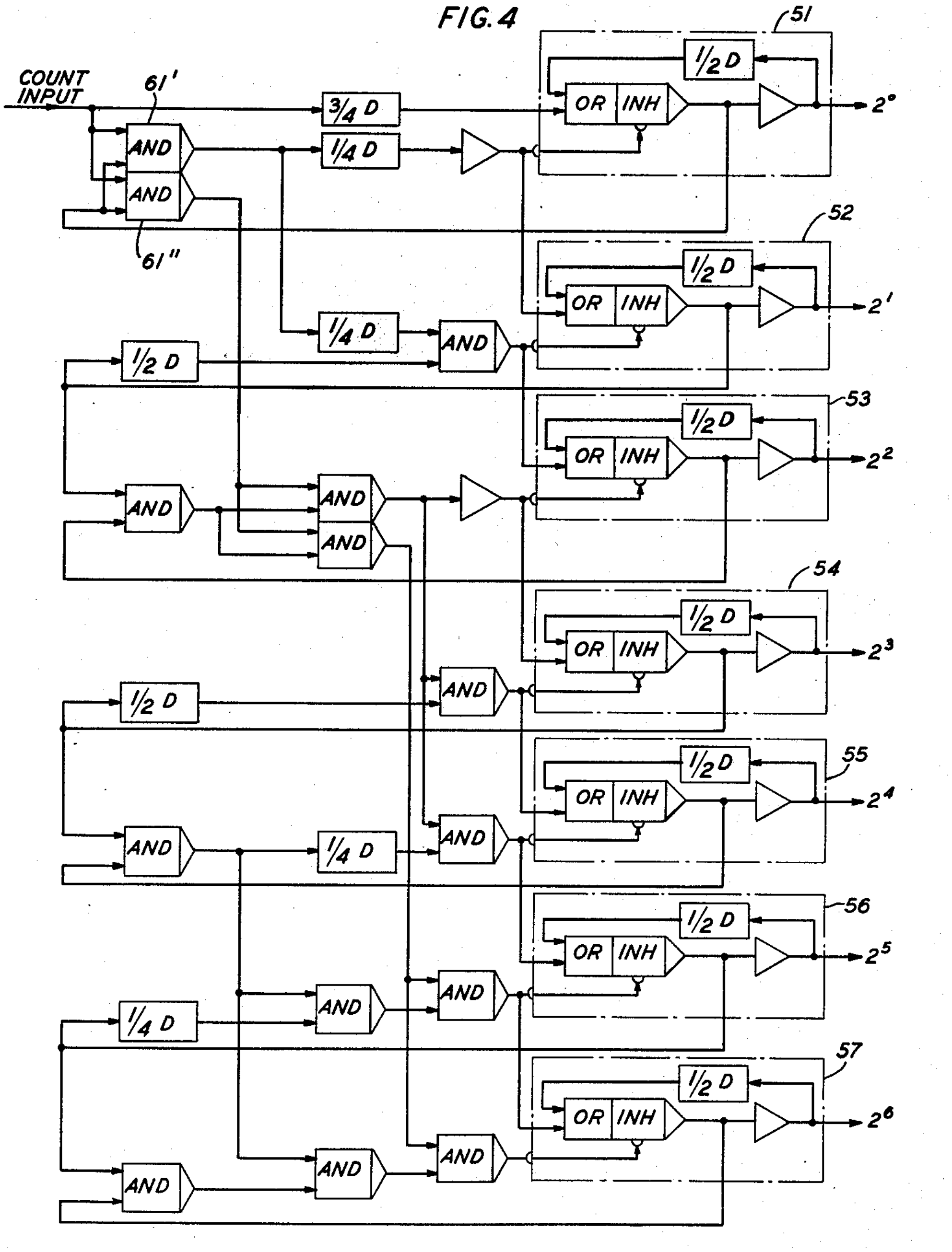
Fig. 4 is a detailed logic circuit diagram of the counter of Fig. 3.

Fig. 4 shows a complete logic circuit diagram for the seven-stage counter of Fig. 3. It differs from Fig. 3 in the introduction of delay units and by the showing of the component parts of each memory cell. In addition, pulse regenerators have been introduced where required to maintain appropriate voltage levels. In general, only a certain maximum load may be driven by a single pulse regenerator to assure adequate margins of operation. As a specific example, one of the rules of circuit arrangement required by the output capacity of the pulse regenerators disclosed in the J. H. Vogelsong patent application Serial No. 437,401 mentioned above is that only three AND circuits may be energized by a single pulse regenerator. Accordingly, in several instances, two AND units with their associated pulse regenerators have been substituted in Fig. 4 for a single AND unit shown in Fig. 3. For example, in Fig. 3 the single AND unit 61 was shown driving the reset terminal of the memory cell 51, the energization input of the memory cell 52, and the two AND units 62 and 63. In Fig. 4, therefore, the two AND units 61' and 61'' are substituted for the AND unit 61 of Fig. 3. In addition, each of the inputs to the AND unit 61 of Fig. 3 have now been paralleled, and are applied to both AND units 61' and 61'' of Fig. 4. Similarly, other AND units which were shown in Fig. 3 as having heavy output loading are replaced in Fig. 4 by a pair of AND units. Fig. 4 also includes padding delay units to insure synchronous operation of the memory cells as described in detail in connection with Fig. 2.

In counters associated with synchronous serial computing apparatus, it is desirable that the counter be capable of counting pulses in successive digit periods. In the computer technology disclosed in Patent 2,888,557 and J. H. Vogelsong application Serial No. 437,401 mentioned above, each AND gate and associated pulse regenerator introduces one-quarter digit period of delay. On this basis, it may be noted that a full digit period is required for the passage of a pulse from the input to the memory cell outputs of the counter of Fig. 4.

Figure 5A:
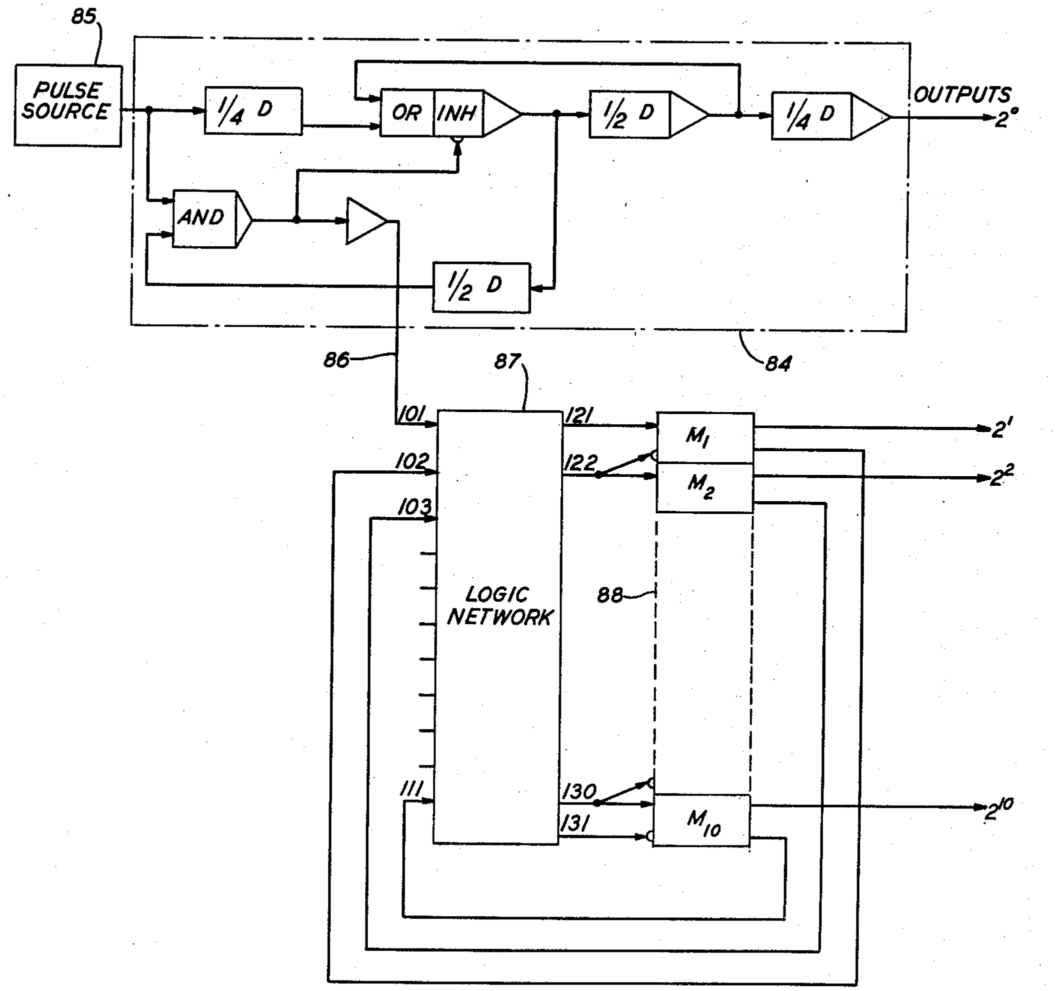
Figs. 5A through 5C show a multistage counter circuit.

It would appear that counters with a larger capacity (requiring more memory cells) could not be built without reducing the speed at which pulses are received. In Fig. 5A, however, this difficulty is overcome by the use of a special separate input stage 84 which includes a memory cell representing the least significant digit of the counter output.

In Fig. 5A, the circuit 84 is a complete one-digit counter stage. When a series of pulses are applied to it in successive digit periods from pulse source 85, carry pulses appear on lead 86 every second digit period. The remainder of the multistage counter of Fig. 5A includes the network 87 and a bank of ten memory cells 88. The large number of memory cells is possible because of the reduced rate at which pulses are applied to the to the logic network 87 from lead 86.

Figure 5B:
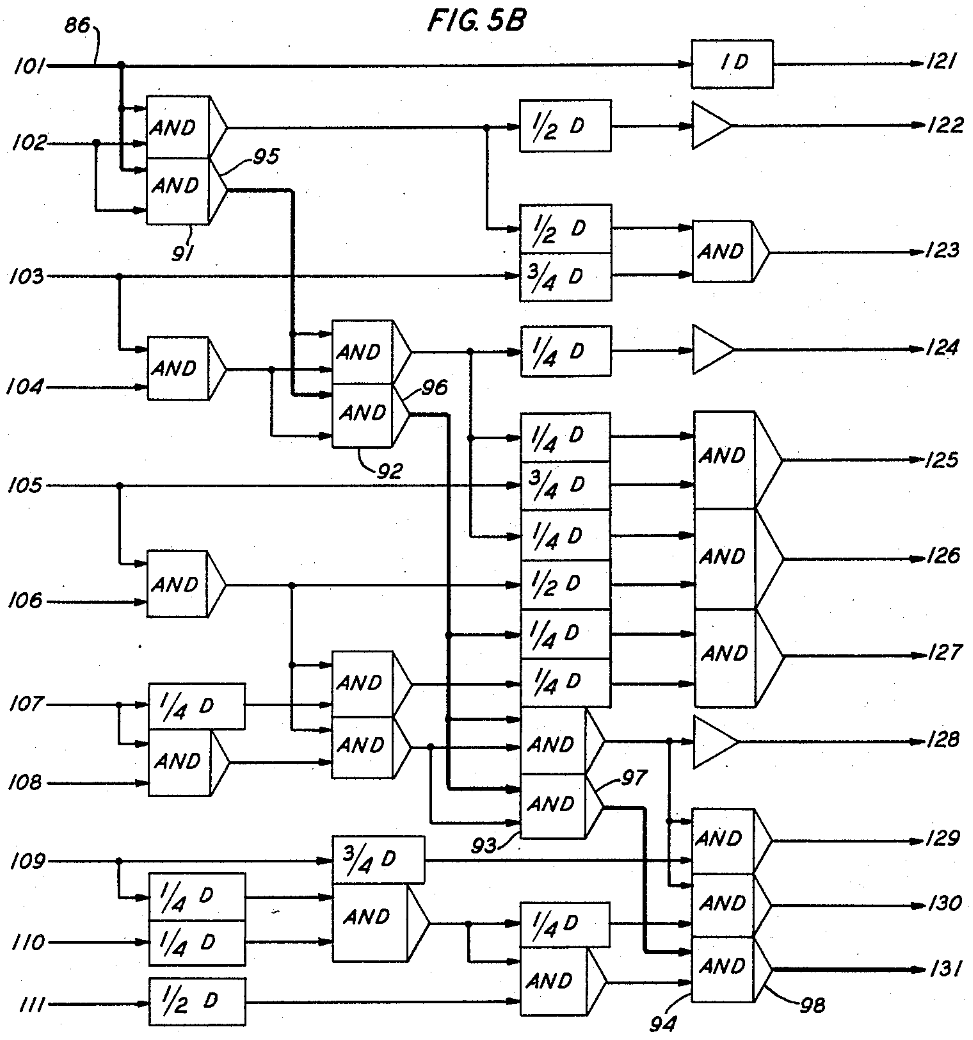

The network 87 of Fig. 5A is shown in detail in Fig. 5B. In Fig. 5B, the numerals 101 through 111 at the left-hand side of the circuit and the numerals 121 through 131 at the right-hand side of the circuit indicate how it is integrated with the other circuit components of Fig. 5A. The circuit of Fig. 5B corresponds roughly to that of Fig. 4, and includes the AND circuits, amplifiers, and delay units required to implement the logic functions necessary for a ten-stage counter. The heavy line which passes through a number of AND units and extends from the upper left corner of Fig. 5B to its lower right-hand corner is one path for pulses applied to input lead 86. In following this path, pulses pass through the four AND units 91 through 94 and the associated pulse regenerators 95 through 98. With each pulse regenerator introducing one-quarter digit peroid of delay, a total of one digit period of delay is introduced by the network of Fig. 5B. A more detailed examination of Fig. 5B will reveal that this is also true for any path from the left-hand edge to the right-hand edge of the circuit shown in this figure.

Figure 5C:
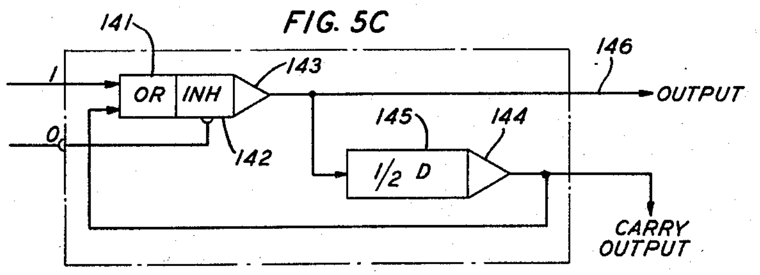

Fig. 5C shows a memory circuit which is represented by each of the memory units $M_1$ through $M_{10}$ in the bank of memory cells 88 in Fig. 5A. The memory cell in Fig. 5C includes the OR unit 141, the inhibit unit 142, two pulse regenerators 143 and 144, and the one-half digit period delay unit 145. It therefore has one digit period of delay in the transmission of a pulse through its delay loop. The output lead 146 of the memory cell shown in Fig. 5C is connected to the memory cell delay loop between the regenerator 143 and the delay unit 145 to insure coincidence in the transitions of the memory cells representing the more significant digits with the change of output signal from the memory cell included in circuit 84 of Fig. 5A.

The restriction on the number of memory cells has been lifted in the counter circuit of Figs. 5A through 5C by the use of the separate input counter stage 84. The advantage of simultaneous transitions of all counter stages from one number to the next subsequent output number has still been retained. In addition, the time required for handling the carry function is maintained at a relatively short value as compared with counters of the prior art.

When a binary counter circuit such as that shown in Fig. 5A is employed, the logic network 87 may take up to one and three-quarter digit periods for the required gating function, and still count pulses appearing in successive digit periods. This permits the use of arrays of AND units having up to seven AND units in sequence. Such an array would provide a logic circuit corresponding to circuit 87 of Fig. 5A, but with 128 outputs. These 128 output could potentially drive 127 memory cells with a total count of $2^{127}$, which is approximately equal to $10^{38}$. Although practical usage of such a circuit does not appear imminent, as it would take $10^{24}$ years to fill the counter at a rate of 3,000,000 pulses per second, there are no obstacles from a circuit standpoint to the construction of such a circuit.

In considering the array of AND units in the counters of Figs. 3 and 5, it is interesting to note that they form a binary array of AND units. The significance of the phrase "binary array of AND units" may be readily appreciated from a consideration of Fig. 3. In Fig. 3, pulses are applied to the first column of AND units 61, 64, 69, and 72 simultaneously, to AND units 62, 63, 70 and 71 in the next column one-quarter digit period later, and to the AND units 65 through 68 in the third column after an additional one-quarter digit period. Now, representing the presence or absence of an AND unit by a "1" or a "0," respectively, in the input to each memory cell the following pattern results:

*Table III*

| Array of AND Units | | | Input Circuit Associated With— |
|---|---|---|---|
| Col. 1 | Col. 2 | Col. 3 | |
| 1 | 0 | 0 | Memory Cell 51. |
| 0 | 1 | 0 | Memory Cell 52. |
| 1 | 1 | 0 | Memory Cell 53. |
| 0 | 0 | 1 | Memory Cell 54. |
| 1 | 0 | 1 | Memory Cell 55. |
| 0 | 1 | 1 | Memory Cell 56. |
| 1 | 1 | 1 | Memory Cell 57. |

The rows of "0" and "1" symbols in Table III represent the binary numbers 1 through 7 in their proper order, with the least significant binary digit to the left.

The logic circuitry connecting the pulse source to the input leads of the memory cells and connecting the carry output to the input leads of the memory cells in the circuit of Fig. 3 therefore clearly constitutes a binary array of AND units. The AND arrays in the logic circuits of Fig. 4 and Fig. 5B are equivalent in function and in the coincident gating mode of operation to the array of Fig. 5, and the term "binary array" is therefore also applicable to these circuits.

It is to be understood that the above-described arrangements are illustrative of the application of the principles of the invention. Numerous other arrangements may be devised by those skilled in the art without departing from the spirit and scope of the invention.

What is claimed is:

1. In a binary counter, a group of memory cells each having energization and reset input terminals and a carry output terminal, a plurality of control leads, said control leads being connected to the reset terminal of a memory cell representing a binary digit of a preassigned significance and to the energization input terminal of the memory cell representing the next more significant binary digit, a source of input pulses to be counted, an array of AND units connecting said pulse source and the carry output terminal of each memory cell to the control leads of memory cells in said group representing more significant digits, said array including a first AND unit having an input terminal connected to said source of pulses and its output terminal connected in common to a first one of said control leads and to the input terminals of a plurality of additional AND units, the output terminals of said additional AND units being connected respectively to other of said control leads associated with memory cells representing digits of greater significance, whereby pulses from said source of input pulses are gated through said array of AND units to all of the control leads connected to the reset input terminals of the consecutive memory cells which are energized including the cells representing the least significant binary digit, each of said AND units introducing a predetermined amount of delay, and means including a plurality of padding delay units associated with said array of AND units for equalizing the delay between said source of input pulses and each of said control leads.

2. A counter circuit comprising at least three memory cells of progressively increasing binary significance, each said memory cell having energization and reset input leads and having an output lead, the reset input lead taking precedence over the energization input lead, a source of input pulses to be counted, a circuit connecting said source of pulses to the energization input lead of said first memory cell, four AND units, circuits connecting the output from said source of pulses and the output from said first memory cell to the inputs to a first one of said AND units, the output from said first AND unit being connected to the reset input lead of said first memory cell, to the energization input lead of said second memory cell and to one input to each of the second and third of said AND units, the output from said second AND unit being connected to the reset lead of said second memory cell and to the energization input lead of said third memory cell, the output from said third AND unit being connected to the reset lead of said third memory cell, and the fourth of said AND units having its output connected to another input of said third AND unit, the output lead of said second memory cell being connected to another input to said second AND unit and to one input to said fourth AND unit, the output lead of said third memory cell being connected to another input of said fourth AND unit.

3. A counter circuit comprising at least three memory cells of progressively increasing binary significance, each said memory cell having energization and reset input leads and having carry and signal output leads, the reset input lead taking precedence over the energization input lead, a source of input pulses to be counted, a circuit connecting said source of pulses to the energization input of said first memory cell, four AND units, circuits connecting the output from said source of pulses and the carry output lead from said first memory cell to the inputs to a first one of said AND units, the output from said first AND unit being connected to the reset input lead of said first memory cell, to the energization input lead of said second memory cell and to one input to each of the second and third of said AND units, the output from said second AND unit being connected to the reset lead of said second memory cell and to the energization input lead of said third memory cell, the output from said third AND unit being connected to the reset lead of said third memory cell, the fourth of said AND units having its output connected to the other input to said third AND unit, the carry output lead from said second memory cell being connected to another input to said second AND unit and to one input to said fourth AND unit, the carry output lead from said third memory cell being connected to another input to said fourth AND unit, and padding delay means connected in said circuitry to equalize the delay between said source of pulses and the signal output leads of said memory cells and between the carry output leads of said memory cells through said AND units and the successive memory cells to the signal output leads of the memory cells.

4. In a binary counter, a group of memory cells each having energization and reset input terminals, a plurality of control leads, said leads being connected to the reset terminal of a memory cell representing a binary digit of a preassigned significance and to the energization input terminal of the memory cell representing the next more significant binary digit, a source of input pulses to be counted, an array of AND units connecting said pulse source and the output from each memory cell to the control leads of those memory cells in said group representing more significant digits, said array including first and second AND units, said second AND unit having its output connected to one of said control leads, and having one of its inputs connected to the output from said first AND unit, means for applying pulses from said source of input pulses to another input to said second AND unit, and circuit means for connecting the outputs from at least two memory cells to the inputs of said first AND unit.

5. In a binary counter, a group of memory cells each having energization and reset input terminals, separate control leads connected to the reset terminal of each memory cell and to the energization input terminal of the memory cell representing the next more significant binary digit, a source of input pulses to be counted, and an array of AND units connecting said pulse source and the output from each memory cell to the control leads of those memory cells in said group representing more significant digits, said array including a first AND unit having its input connected to said source of pulses and its output connected to a first one of said control leads and having its output connected directly to the respective inputs of a plurality of additional AND units, the outputs from said additional AND units being connected respectively to others of said control leads associated with memory cells representing digits of greater significance.

6. A binary counter comprising a plurality of memory cells each having energization and reset input terminals and having signal and carry output terminals, a source of pulses, an array of AND units connecting said source of pulses and said carry output terminals to said input terminals of said memory cells, one of the AND units in said array being connected to receive pulses from said source of pulses and from one of said carry output terminals at a predetermined time, another of the AND units in said array being connected to receive pulses only from said carry output terminals of a plurality of said memory cells at the same predetermined time, and padding delay means for equalizing the delay between said source of pulses and the signal output terminal of each of said memory cells, and between the carry output terminals of said memory cells, through said array of AND units and said memory cells to the signal output terminal of each of said cells.

7. A binary counter comprising a plurality of memory cells each having energization and reset input terminals and a carry output terminal, a source of pulses, and an array of AND units connecting said source of pulses and said carry output terminals to said input terminals of said memory cells, one of the AND units in said array being connected to receive pulses from said source of pulses and one of said output terminals at a predetermined time, another of the AND units in said array being connected to receive pulses only from said carry output terminals of a plurality of said memory cells at the same predetermined time.

References Cited in the file of this patent

UNITED STATES PATENTS

| | | |
|---|---|---|
| 2,571,680 | Carbrey | Oct. 16, 1951 |
| 2,719,228 | Auerbach et al. | Sept. 27, 1955 |
| 2,734,684 | Ross et al. | Feb. 14, 1956 |

| | | |
|---|---|---|
| 2,735,005 | Steele | Feb. 14, 1956 |
| 2,774,868 | Havens | Dec. 18, 1956 |
| 2,824,228 | Carmichael | Feb. 18, 1958 |

OTHER REFERENCES

Sherertz: Electronic Circuits of the NAREC Computer, Proceedings of the I.R.E., October 1953, pages 1313 to 1320.

Cohen: A Formal Procedure For The Logical Design Of An Optimum Binary Counter, Proceedings of the National Electronics Conference, 1954, pages 523 to 532.